(12) United States Patent  
Korenblit et al.

(10) Patent No.: US 7,982,946 B1  
(45) Date of Patent: Jul. 19, 2011

(54) MODULATION OF TERAHERTZ RADIATION GENERATED IN MAGNON GAIN CAVITY

(75) Inventors: Yehiel Korenblit, Netanva (IL); Boris G. Tankhilevich, Walnut Creek, CA (US)

(73) Assignee: Terahertz Technologies LLC, Walnut Creek, CA (US)

( * ) Notice: Subject to any disclaimer, the term of this patent is extended or adjusted under 35 U.S.C. 154(b) by 0 days.

(21) Appl. No.: 12/661,153

(22) Filed: Mar. 10, 2010

Related U.S. Application Data

(60) Division of application No. 11/891,360, filed on Aug. 9, 2007, now Pat. No. 7,706,056, which is a continuation-in-part of application No. 11/799,937, filed on May 2, 2007, now Pat. No. 7,471,449, which is a continuation-in-part of application No. 11/481,197, filed on Jul. 3, 2006, now Pat. No. 7,430,074.

(51) Int. Cl.
 *H01S 5/00* (2006.01)
 *H01S 3/10* (2006.01)
 *H01S 1/02* (2006.01)
 *H01S 3/16* (2006.01)

(52) U.S. Cl. .................. 359/342; 372/37; 372/43.01

(58) Field of Classification Search .................. 359/342; 372/37, 43.01
 See application file for complete search history.

(56) References Cited

U.S. PATENT DOCUMENTS

| | | | |
|---|---|---|---|
| 3,822,410 A | 7/1974 | Madey | |
| 3,986,194 A | 10/1976 | Masumoto et al. | |
| 4,626,800 A | 12/1986 | Murakami et al. | |
| 4,679,023 A | 7/1987 | Nelson | |
| 4,914,665 A | 4/1990 | Sorin | |
| 6,111,416 A | 8/2000 | Zhang et al. | |
| 6,230,038 B1 | 5/2001 | von Gutfeld et al. | |
| 6,365,286 B1 | 4/2002 | Inomata | |
| 6,614,827 B1 | 9/2003 | Mooradian | |
| 6,912,148 B2 | 6/2005 | Hannah et al. | |
| 6,943,651 B2 | 9/2005 | Mukaiyama et al. | |
| 6,988,058 B1 | 1/2006 | Sherwin et al. | |
| 2001/0031547 A1 | 10/2001 | Ohno et al. | |
| 2002/0058120 A1 | 5/2002 | Uchida et al. | |
| 2003/0021908 A1 | 1/2003 | Nickel et al. | |
| 2004/0094801 A1 | 5/2004 | Liang et al. | |
| 2005/0242287 A1 | 11/2005 | Hakimi | |
| 2006/0060815 A1 | 3/2006 | Punnoose | |
| 2006/0088324 A1 | 4/2006 | Fujimoto et al. | |
| 2006/0108619 A1 | 5/2006 | Yoshida et al. | |
| 2006/0238191 A1 | 10/2006 | Saito | |

OTHER PUBLICATIONS

Tankhilevich et al., "Terahertz Imaging and Spectroscopy: Advances in Power and Tunability", Proceedings of the 2010 World Molecular Imaging Congress, vol. 12, Suppl 2, pp. S1340, Dec. 2010.

Tankhilevich et al. "Novel spintronic device; terahertz magnon-photon laser", Journal of Physics: Conf. Ser. 263 012004, 1st International Symposium on Spintronic Devices and Commercialization (ISSDC2010), IOP Publishing, Feb. 2011.

(Continued)

*Primary Examiner* — Eric Bolda  
(74) *Attorney, Agent, or Firm* — Boris G. Tankhilevich (57) ABSTRACT

An apparatus and method for generating modulated terahertz radiation are provided. The apparatus comprises: (A) a means for generating Terahertz radiation by pumping nonequilibrium electrons into Magnon Gain Medium (MGM); wherein the nonequilibrium electrons emit nonequilibrium magnons, and wherein interaction between nonequilibrium magnons in the Magnon Gain Medium (MGM) causes generation of Terahertz radiation; and (B) a means for modulating the generated Terahertz radiation. The modulating means further comprises: an AC magnetic field generator, or an AC electric field generator.

29 Claims, 3 Drawing Sheets

OTHER PUBLICATIONS

U.S. Appl. No. 11/481,197: Office Action—Election/Restrictions dated Jun. 5, 2007.

U.S. Appl. No. 11/481,197: Office Action dated Aug. 31, 2007.

U.S. Appl. No. 11/481,197: Notice of Allowance and Fee(s) Due dated Feb. 22, 2008.

U.S. Appl. No. 11/496,889: Notice of Allowance and Fee(s) Due dated Jun. 30, 2008.

U.S. Appl. No. 11/701,284: Office Action dated Mar. 6, 2008.

U.S. Appl. No. 11/701,284: Notice of Allowance and Fee(s) Due dated Oct. 6, 2008.

U.S. Appl. No. 11/799,937: Notice of Allowance and Fee(s) Due dated Oct. 9, 2008.

U.S. Appl. No. 11/891,360: Office Action—Election/Restrictions dated Mar. 30, 2009.

U.S. Appl. No. 11/891,360: Notice of Allowance and Fee(s) Due dated Dec. 24, 2009.

J.D. Bierlein and P.M. Richards, "Harmonic Generation and Parametrically Coupled Spin Waves in Yttrium Iron Garnet", Physical Review B, Jun. 1, 1970, pp. 4342-4357, vol. 1, No. 11.

M. I. Kaganov and V. M. Tsukernik, "NonResonance Absorption of Oscillating Magnetic Field Energy by a Ferromagnetic Dielectric", Soviet Physics JETP, Mar. 1960, pp. 587-592, vol. 37 (10), No. 3.

J.P. Lascaray, J.P. Desfours and M. Averous, "Bound Magnetic Polaron Evidence in EuO", Solid State Communications, 1976, pp. 677-679, vol. 19, Pergamon Press.

I. YA. Korenblit and B. G. Tankhilevich, "Generation of High-Frequency Magnons in a Ferromagnetic Semiconductor", Pis'ma Zh. Eksp. Teor. Fiz. 24, No. 11, pp. 598-601 (Dec. 5, 1976).

I. YA. Korenblit and B. G. Tankhilevich, "Generation of High-Frequency Magnons by NonEquilibrium Electrons Polarized Opposite to the Direction of Magnetization", Soviet Physics JETP, Dec. 1977, pp. 1167-1175, vol. 46, No. 6.

I. YA. Korenblit, A. A. Samokhvalov and V. V. Osipov, "Heating and Generation of Magnons by NonEquilibrium Electrons in Ferromagnetic Semiconductors", Soc. Sci. Re. A. Phys., 1987, pp. 447-517, vol. 8, Harwood Academic Publisher GmbH.

L. Passell, O. W. Dietrich and J. Als-Nielsen, "Neutron Scattering From the Heisenberg Ferromagnets EuO and EuS. I. The Exchange Interactions", Physical Review B, Dec. 1, 1976, pp. 4897-4907, vol. 14, No. 11.

M. Tsoi; A. G. M Jansen; J. Bass; W.-C. Chiang; V. Tsoi; P. Wyder, "Generation and Detection of Phase-Coherent Current-Driven Magnons in Magnetic Multilayers", Letters to Nature, Nature, Jul. 6, 2000, p. 46-48, vol. 406, Macmillan Magazines L.

J. Schoenes and P. Wachter, "Exchange Optics in Gd-doped EuO", Physical Review B, Apr. 1, 1974, pp. 3097-3105, vol. 9, No. 7.

M. Belhadi; A. Khater, "Spin Wave Modes and Magnon Scattering At Surface Nanostructure on 2D Heisenberg Ferromagnets", Surface Review and Letters, 2004, p. 99-109, vol. 11, No.

U.S. Appl. No. 12/290,527: Office Action—Electron/Restrictions dated Oct. 1, 2010.

U.S. Appl. No. 12/290,527: Office Action dated Dec. 3, 2010.

Korenblit et al. "High Frequency Magnon Generation by NonEquilibrium Electrons and the Instability of the Magnon System", Physics Letters, vol. 64A, No. 3, pp. 307-330, Dec. 1977.

MODULATION OF TERAHERTZ RADIATION GENERATED IN MAGNON GAIN CAVITY

This is a divisional application of the U.S. patent application Ser. No. 11/891,360, filed on Aug. 9, 2007 now U.S. Pat. No. 7,706,056, and entitled "Modulation of Terahertz Radiation", which is the continuation-in-part of the U.S. patent application Ser. No. 11/799,937, filed on May 2, 2007, and issued as U.S. Pat. No. 7,471,449, which is a continuation-in-part of the U.S. patent application Ser. No. 11/481,197, filed on Jul. 3, 2006, and issued as U.S. Pat. No. 7,430,074.

TECHNICAL FIELD

The technology relates to the Magnon Laser effect.

BACKGROUND

The U.S. Pat. No. 7,430,074 is herein referred to as the patent '074. The U.S. Pat. No. 7,471,449 is herein referred to as the patent '449.

In the patent '074 a method of THz photon generation was disclosed. The method of patent application #1 comprises: (A) providing a Magnon Gain Medium (MGM), wherein the MGM supports generation of nonequilibrium magnons; and (B) injecting nonequilibrium electrons into the Magnon Gain Medium (MGM). Propagation of nonequilibrium electrons in the Magnon Gain Medium (MGM) causes generation of nonequilibrium magnons. Interaction between nonequilibrium magnons causes generation of THz photons.

In the patent '449 an apparatus for generation of Terahertz radiation was disclosed. The apparatus of the patent '449 comprises: (A) a Magnon Gain Medium (MGM), wherein the MGM supports generation of nonequilibrium magnons; and (B) at least one magnon mirror (MM). The nonequilibrium magnons are generated in the Magnon Gain Medium (MGM). Interaction between nonequilibrium magnons leads to generation of Terahertz photons.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

An apparatus and method for generating modulated terahertz radiation are provided. The apparatus comprises: (A) a means for generating Terahertz radiation by pumping nonequilibrium electrons into Magnon Gain Medium (MGM); wherein the nonequilibrium electrons emit nonequilibrium magnons, and wherein interaction between nonequilibrium magnons in the Magnon Gain Medium (MGM) causes generation of Terahertz radiation; and (B) a means for modulating the generated Terahertz radiation. The modulating means further comprises: an AC magnetic field generator, or an AC electric field generator.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now be made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

A. Introduction. Magnon Gain Medium (MGM).

In an embodiment of the present technology, a Magnon Gain Medium (MGM) includes a conduction (valence band) that splits into two subbands. The first subband is configured to be populated by electrons having spin up, and the second subband is configured to be populated by electrons having spin down. The orientation of spin up is an orientation directed along direction of magnetization of the MGM. The orientation of spin down is an orientation directed opposite to the direction of magnetization in the MGM. In an embodiment of the present technology, two subbands with spin up and spin down are separated by an exchange gap.

In an embodiment of the present technology, the exchange energy is positive, and the bottom of the subband with the spin up is located below the bottom of the subband with the spin down. In an embodiment of the present technology, the gap $\Delta$ is much greater than the maximum of $\{T_C, E_f\}$, wherein $T_C$ is the Curie temperature of MGM, and $E_f$ is the Fermi energy of electrons. In an embodiment of the present technology, only electron states in the lower subband with spin up are occupied in equilibrium, i.e. electrons are fully polarized.

Figure 1:
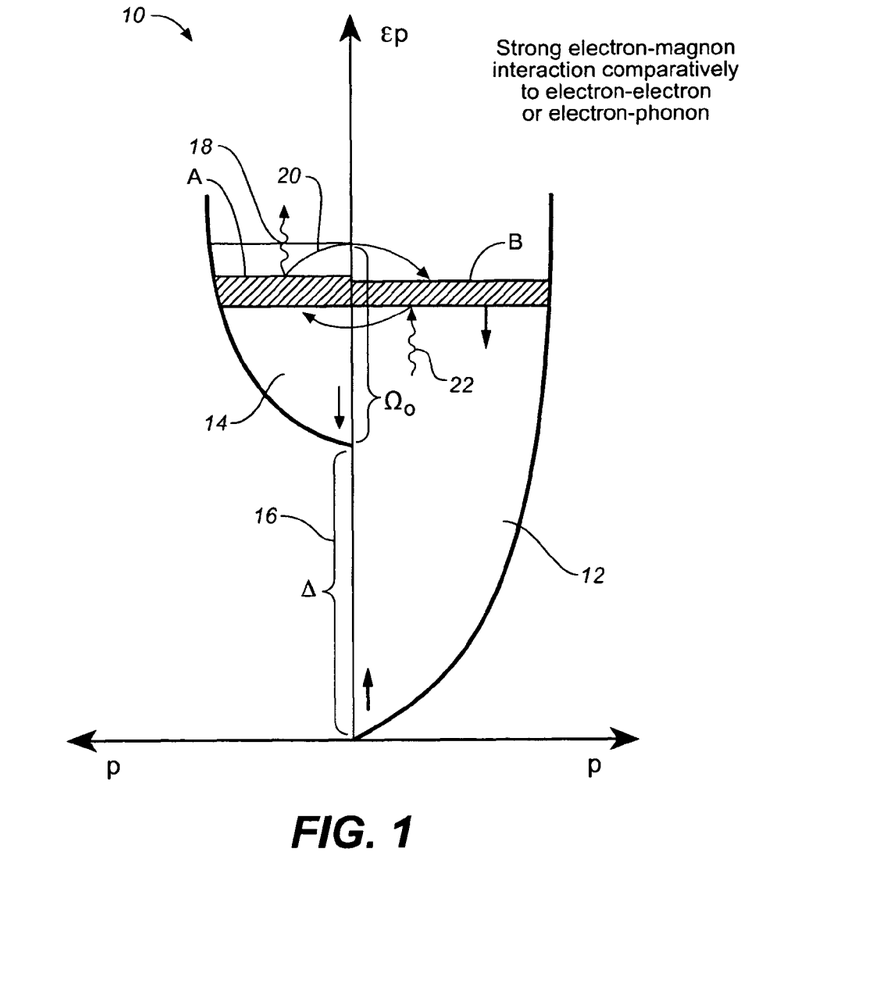
FIG. 1 illustrates Magnon Gain Medium (MGM) further comprising two subbands, wherein a nonequilibrium electron put in the upper subband with spin down rapidly emits a magnon with a large wave vector.

In an embodiment of the present technology, FIG. 1 illustrates a ferromagnetic semiconductor, like EuO, that implements the described above Magnon Gain Medium (MGM), further including two subbands 12 and 14, wherein a nonequilibrium electron put in the upper subband 14 with spin down rapidly emits a magnon 18 with a large wave vector and transitions into the subband 12 with the spin up.

More specifically, the electrons in a ferromagnetic semiconductor can be divided into two groups: free electrons, which determine the electrical conductivity of the semiconductor, and electrons localized at the ions (d-or f-electrons), which determine its magnetic properties.

The main interaction between these two groups of electrons is the exchange interaction, which lifts the spin degeneracy of the electrons. The conduction (valence band) splits into two subbands with spin up (along the magnetization) and spin down, with an exchange gap $\Delta=2I<S_z>$, where I is the exchange energy of the conduction electrons and the localized spins, and $<S_z>$ is the mean value of the localized spins. At temperatures much lower than the Curie temperature, $T_C$, the mean value of the localized spins $<S_z>$ is temperature independent: $<S_z>=S$.

The exchange gap $\Delta$ 16 is usually greater than 0.1 eV. For example, for EuO the exchange gap is: $\Delta=0.6$ eV. For the reference, please see: J. Lascaray, J. P. Desfours, and M. Averous, Sol. St. Com. 19, 677 (1976).

If the exchange energy is positive, I>0, then the bottom of the subband with spin up 12 is located below the bottom of the subband with spin down 14. Usually in ferromagnetic semiconductors the gap $\Delta$ is much greater than the maximum of $\{T_C, E_f\}$. Therefore, only the states in the lower subband 12 are occupied in equilibrium, i.e. the electrons are fully polarized.

A nonequilibrium electron 20 put in the upper subband with spin down rapidly emits a magnon 18, with a large wave vector $q=\hbar^{-1}(2m\Delta)^{1/2}$, where m is the electron effective mass.

It follows from the energy and momentum conservation laws that if the energy of this electron, $\in_p$, measured from the bottom of the spin down subband is much lesser than $\Delta$, the wave vector of the emitted magnon, q lies in the interval $q_1 \leq q \leq q_2$, $q_{1,2}=\hbar^{-1}(p_0 \mp p)$, $p_0=(2m\Delta)^{1/2}$, $p=(2m\in_p)^{1/2}<<p_0$. The frequency of these magnons is in the Terahertz region.

For EuO, the values of electron mass m are inconsistent according to different references. According to one reference, (J. Shoenes and P. Wachter, Phys. Rev. B 9, 3097 (1974)), $m=0.35\ m_0$, $m_0$ is the free electron mass, and the wave vector of the excited magnons $q=q_0=\hbar^{-1} p_0=2.6\ 10^7$ cm$^{-1}$. The spin-wave stiffness $D=10.8\ 10^{-16}$ mev·cm$^2$. (L. Passel, O. W. Dietrich and J. Als-Nielsen, Phys. Rev. B 14, 4897, 1976). This gives the energy of the excited magnons $\hbar\omega=Dq^2=0.73$ meV, and the frequency $f_m=\omega/2\pi=0.19$ THz. Interaction between two magnons with frequency f and wave vectors $\vec{q}$ and $(-)\vec{q}$ generates a photon with frequency 2f (for the reference, please see M. I. Kaganov and V. M. Tsukernik, Sov. Phys. -JETP 37, 587 (1960)). The "main" frequency, or the "main radiation" frequency is defined herein as the frequency of the emitted radiation $f_r=2f_m$. Thus, in the above given example, the main frequency is: $f_r=2f_m=0.38$ THz.

On the other hand, according to another reference (I. Ya. Korenblit, A. A. Samokhvalov and V. V. Osipov, in Sov. Sc. Rev. A, Physics, 8, 447. Harwood Ac. Publ., UK, 1987), the electron mass value in EuO is quite different: $m=1.5\ m_0$. If this is the case, one obtains a quite different value for the main radiation frequency: $f_r=1.6$ THz.

More generally, consider a ferromagnetic semiconductor with $\Delta=0.2$ eV, and $m=0.3\ m_0$. Then we have $q_0=1.4\ 10^7$ cm$^{-1}$. The magnon frequency $\hbar\omega(q_0)=kT_C(q_0 a)^2$, where k is the Boltzmann constant, and a is the lattice constant. With $T_C \approx 100\text{-}300$ K and $a=3\text{-}5\times 10^{-8}$ cm, the magnon frequency is $f_m=1.0$ THz, and the main radiation frequency $f_r=2.0$ THz.

The ratio of the magnon generation rate, $\Gamma_e(\vec{q})$, to the rate $\Gamma_m(\vec{q})$, their relaxation (in collisions with equilibrium magnons) is a function of the wave vector $\vec{q}$. Therefore the non-equilibrium magnon distribution function, $N(\vec{q})$ has a maximum at some wave vector $\vec{q}=\vec{q}*$. $N(\vec{q})$ increases with the increase of the electron pumping, and because of the simulated emission of magnons, the function $N(\vec{q})$ grows most rapidly at $\vec{q}$ close to $\vec{q}*$. When the pumping reaches some critical value, $N(\vec{q}*)$ starts to increase very fast with the increase of the electron pumping. At some conditions the generation of magnons with $\vec{q}=\vec{q}*$ becomes avalanche-like, and the magnon system becomes unstable. For more details, please see references: I. Ya. Korenblit and B. G. Tankhilevich, Sov. Phys. -JETP, 46, 1167 (1977); I. Ya. Korenblit and B. G. Tankhilevich, Sov. Phys. -JETP Lett. 24, 555 (1976); I. Ya. Korenblit and B. G. Tankhilevich, Phys. Lett. A 64, 307 (1977), and equations below. As a result, an intense Terahertz radiation can be obtained. Please, see the patent '074.

B. Introduction. Magnon Mirrors (MM).

The present technology is applicable to any material comprising Magnon Gain Medium (MGM). Nonequilibrium electrons pumped into MGM generate nonequilibrium magnons. After the pumping threshold is reached, the nonequilibrium magnons in MGM will lase. However, the probability of lasing of the generated in the MGM nonequilibrium magnons is increased by employing at least one Magnon Mirror (MM). The interaction between nonequilibrium magnons in MGM causes generation of THz photons. Please, see the patent '449.

Figure 2:
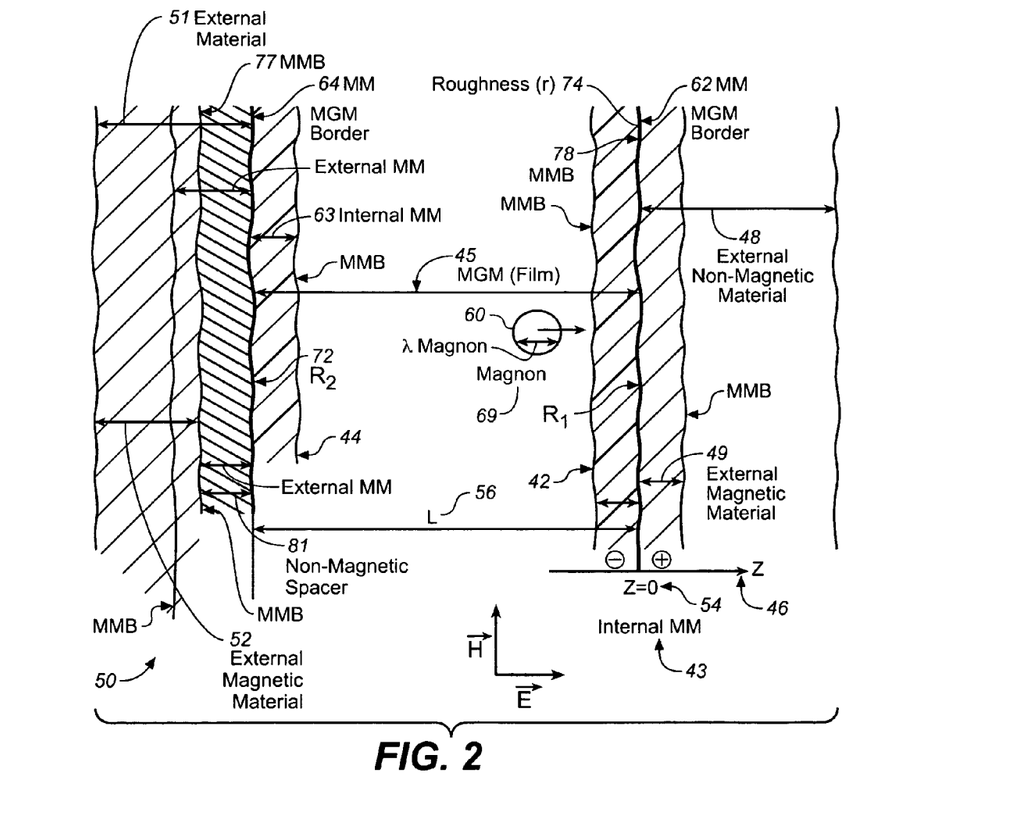
FIG. 2 shows ferromagnetic material comprising a Magnon Gain Medium (MGM) and at least one Magnon Mirror (MM).

One can get a strong anisotropy of the magnon emission by employing two Magnon Mirrors (MM) (62 and 64) separated by the Magnon Gain Medium (MGM) 45, as shown in FIG. 2. The discussion of Magnon Mirror (MM) herein is focused on Magnon Gain Medium (MGM) comprising a MGM film 45. Please, see the patent '449 for more detailed discussion.

The Magnon Mirrors 62 and 64 also serve as a magnon cavity, and when the electron pumping rate $g_e$ exceeds the electron threshold pumping rate $g_{th}$, only the magnons 61 that move perpendicular to the mirrors meet the amplifying condition which leads to an exponential increase in their numbers with time. (Patent '449). More generally, a magnon cavity comprises at least one Magnon Mirror (MM) 62 (or 64). A magnon gain cavity is defined as a magnon cavity including a Magnon Gain Medium.

In an embodiment of the present technology, it is assumed that z-axis 46 is directed perpendicular to the Magnon Gain Medium (MGM) border 72 which separates MGM film 45 and an external non-magnetic material 48.

In another embodiment of the present technology, the Magnon Mirror (MM) 64 is adjacent to a non-magnetic spacer 81 that separates MGM film 45 and the external magnetic material 52, wherein MGM film 45 and external magnetic material 52 are having different exchange couplings. It is also assumed that the exchange interaction, j between spins across the MGM border 64 is less than the exchange interaction inside the MGM 45.

Referring still to FIG. 2, consider the MGM film 45 of thickness L 56 which satisfies the inequality $L>>\lambda$, where $\lambda$ 60 is the wave length of spin-wave (SW) (magnon) 61. Based on the estimations given in the patent '074, depending on the value of the effective electron mass, the spin-wave (SW) wave length 60 is: $\lambda=(5\ 10^{-9}\ \text{m-}2.5\ 10^{-9}\ \text{m})$.

SW cannot propagate in a non-magnetic media 48. However, SW (magnon) 61 can get reflected from MGM borders 62 and 64. The average roughness 74, r, is defined as an absolute value of the surface height averaged over the surface.

In the patent '449 it is assumed, that the geometrical optics approximation for magnons is valid. Thus, the roughness, r 74, of the border (interface) 62 should be less than the SW length λ 60.

Thus, the following inequalities should be satisfied: r (the roughness 74 of the MGM border 62)<<λ (the spin-wave 61 (SW) wave length 60)<<L (the thickness 56 of MGM film 45).

C. Theory. Frequency Modulation of THz Waves Via Application of AC Magnetic Field.

The present patent application discloses methods of modulation of Terahertz photons generated by nonequilibrium magnons in a ferromagnetic material comprising Magnon Gain Medium (MGM) (or comprising MGM and at least one Magnon Mirror).

Figure 3:
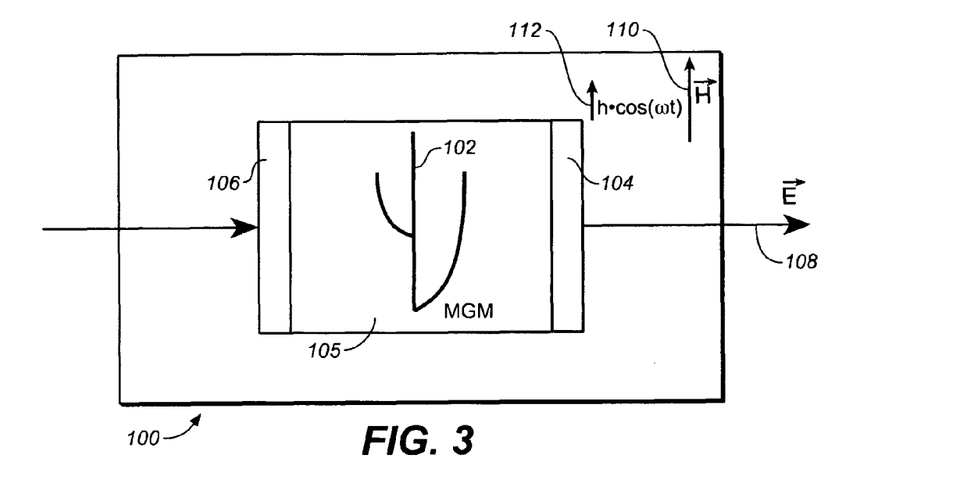
FIG. 3 illustrates frequency modulation of THz waves via AC longitudinal magnetic field applied to the ferromagnetic material comprising the Magnon Gain Medium (MGM) and at least one Magnon Mirror (MM) for the purposes of the present technology.

In an embodiment of the present technology, the modulation of Terahertz waves generated by interaction between nonequilibrium magnons in a ferromagnetic material 105 comprising MGM 102 (or comprising MGM 102 and Magnon Mirrors 104 and 106), is performed by applying longitudinal AC magnetic field h(t)=h cos (ωt) 112, as shown in FIG. 3. In this embodiment of the present technology, a DC electric field 108 (an electron pumping means) is configured to inject the nonequilibrium electrons into the MGM 102. Direct current (DC) magnetic filed H 110 is applied to remove the domain structure in the ferromagnetic material 105, and to tune the main frequency of THz radiation, if it is desirable. The MGM 102 is denoted by a special symbol that indicates presence of two subbands with spin up and spin down.

Let us consider how longitudinal AC magnetic field affects the properties of spin waves (SW) spectrum in the ferromagnetic 105.

More specifically, we are interested in SW, with high frequencies, $\omega_q$ satisfying the inequality $\omega_q >> \gamma M$, where $\gamma = g\mu_B/\hbar = 1.76 \times 10^{11}$ Hz/T is the gyromagnetic ratio, and M is the magnetization. The frequency of the generated magnons in EuO is $\omega_q = 5-10$ THz.

The transverse fluctuations, $m_q = m_x(q) + im_y(q)$, of the magnetic moment in longitudinal AC magnetic field 112:

$$h(t) = h \cos \omega t \qquad \text{Eq. (1)}$$

satisfy the equation:

$$\dot{m}_q = i(\omega_q + \gamma \cdot h \cos(\omega \cdot t))m_q \qquad \text{Eq. (2)}$$

Here $\omega_q$ is the spin-wave spectrum, $$\omega_q = \gamma H + Dq^2, \qquad \text{Eq. (3)}$$

where H is the applied DC magnetic field 110.

The solution of Eq. (2) is as follows:

$$m_q(t) = m_q(0)\exp\left[i\left(\omega_q t + \gamma \int h(t)dt\right)\right] = \qquad \text{Eq. (4)}$$
$$m_q(0)\exp\left[i\left(\omega_q t + \gamma \int h \cos \omega t\, dt\right)\right] =$$
$$m_q(0)\exp[i(\omega_q t + (\gamma h/\omega)\sin \omega t)]$$

According to Eq. (4) the transverse fluctuations, $m_q(t)$ of the magnetic moment are frequency modulated (FM) by the applied longitudinal AC magnetic field h(t). (For the reference, please see "Principles of Communication Engineering", by Wozencraft and Jacobs, published by John Wiley & Sons, Inc., 1965, page 645.)

An exact expression for the spectrum of frequency modulated (FM) transverse fluctuations of the magnetic moment can be obtained because h(t) is assumed to be a sinusoid (or cosine according to (Eq. (1)).

More specifically, the Fourier series for $m_q$ is as follows:

$$m_q(t) = m_q(0) \sum_{n=-\infty}^{\infty} J_n\left(\frac{\gamma h}{\omega}\right)\exp[i(\omega_q + n\omega)t], \qquad \text{Eq. (5)}$$

where $J_n$ are Bessel functions, and $J_{-n}(x) = (-)J_n(x)$.

It is convenient to rewrite this equation as:

$$m_q(t) = m_q(0) \sum_{n=-\infty}^{\infty} J_n\left(\frac{\gamma h}{2\pi f}\right)\exp[i(\omega_q + 2\pi nf)t], \qquad \text{Eq. (6)}$$

where $\omega = 2\pi f$. Here $\gamma/2\pi = 2.8 \cdot 10^{10}$ Hz/T.

Thus, with $h = 10^{-3}$ T, and the modulation frequency f=10 MHz, one gets $\gamma h/2\pi f = 2.8$. Since the argument of the Bessel functions is greater than one, many modes contribute to $m_q(t)$ in Eq. (6).

The greater the modulation frequency f, the higher the amplitude of the alternative longitudinal field h 112 that should be applied to ferromagnetic 105 to keep the argument of the Bessel function greater than 1. For example, for the modulation frequency f=1 GHz, an AC longitudinal magnetic field 112 having an amplitude $h \approx 10^{-1}$ T should be applied to keep the argument of the Bessel function greater than 1.

The transverse fluctuations, $m_q$ of the magnetic moment in a longitudinal AC magnetic field satisfy the equation Eq. (2) which is a Schrodinger-type equation for frequency modulated quasi-magnons having the spectrum $$\omega_q(t) = \gamma H + Dq^2 + h(t); \qquad \text{Eq. (7)}$$

Because of the uniformity of the space, interaction between two such quasi-magnons with wave vectors q and q' should generate a quasi-photon having a wave vector $$\vec{k} = \vec{q} + \vec{q}' \qquad \text{Eq. (8)}$$

More specifically, it follows from Eq. (5) that each magnon now is a superposition of quasi-magnons which are specified by two quantum numbers, q and n:

$$m_q(t) = m_q(0) \sum_{n=-\infty}^{\infty} J_n\left(\frac{\gamma h}{\omega}\right)\exp[i(\omega_q + n\omega)t] = \qquad \text{Eq. (9)}$$
$$m_q(0) \sum_{n=-\infty}^{\infty} J_n\left(\frac{\gamma h}{\omega}\right)\exp[iF(q,n)t]$$

where $$F(q,n) = \omega_q + n\omega \qquad \text{Eq. (10)}$$

Therefore, the frequency modulated photon should also be a superposition of quasi-photons, i.e. the photon field should be proportional to:

$$\phi(k,t) = \Sigma A(l)\exp[i\{v(k)+l\omega\}t]; \qquad \text{Eq. (11)}$$

Where $$\phi(k,l) = v(k) + l\omega. \qquad \text{Eq. (12)}$$

Then the energy conservation law should look like:

$$F(q,n) + F(q',n') = \phi(k,l), \qquad \text{Eq. (13)}$$

That is two quasi-magnons give birth to one quasi-photon. It follows from the discussion given above, that quasi-photons generated by interaction between two quasi-magnons can be also frequency modulated with the modulation frequency ω by application of the same longitudinal AC magnetic field 112: h(t)=h cos ωt.

D. Experimental Setup. Frequency Modulation Via AC Magnetic Field.

J. D. Bierlein and Peter M Richards have investigated second-harmonic generation and ferromagnetic resonance in spheres of yttrium Iron Garnet (YIG) as a function of incident power above the threshold for excitation of z-directed spin waves by the second-order Suhl instability. Phys. Rev B, Vol. 1, 11, Jun. 1970, p. 4342. The analogous microwave circuitry can be used to perform the discussed above FM modulation of THz quasi-photons generated by interaction between two quasi-magnons.

E. Theory. Modulation of THz Waves Via AC Electric Field.

Figure 4:
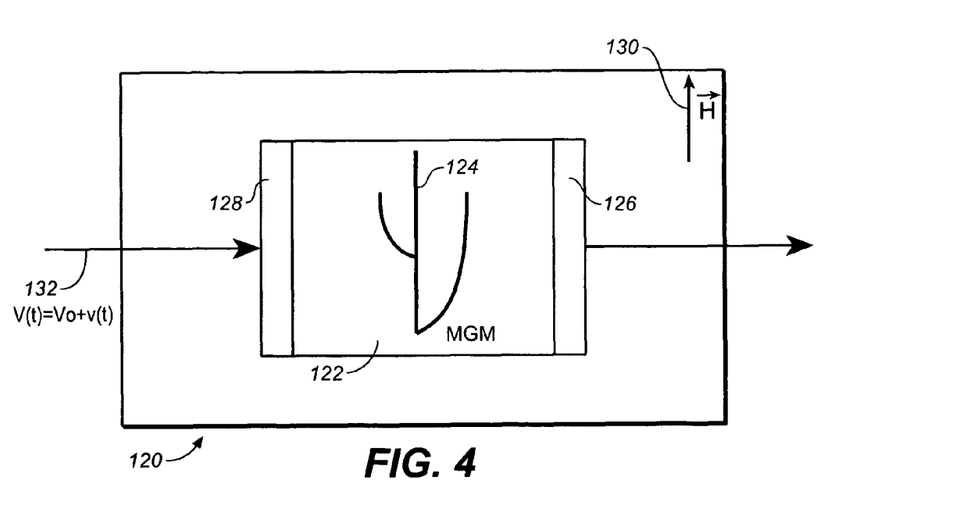
FIG. 4 is an illustration of frequency modulation of THz waves via AC electric field applied to the ferromagnetic material comprising the Magnon Gain Medium (MGM) and at least one Magnon Mirror (MM) for the purposes of the present technology.

In an embodiment of the present technology, FIG. 4 illustrates the frequency modulation of THz waves in the ferromagnetic 122 comprising MGM 124 (or comprising MGM 124 and Magnon Mirrors (MM) 128 and 126) via AC electric field 132. Direct current (DC) magnetic filed H 130 is applied to remove the domain structure in the ferromagnetic material 122, and to tune the main frequency of THz radiation, if it is desirable.

The concentration of electrons in the spin-down subband (14 of FIG. 1) depends on the bias, V. Hence the Fermi energy $E_f$ of these electrons also depends on V: $E_f = E_f(V)$.

Suppose that the bias 132, V, changes with time according to:

$$V(t)=V_0+v(t), v(t)<<V_0.$$ Eq. (14)

Then the Fermi energy depends on time in the following way:

$$E_f=E_f(V)=E_f(V_0+v(t))=E_f^0(1+Bv(t)),$$ Eq. (15)

Where $E_f^0 = E_f(V_0)$ and $B = \partial \ln E_f / \partial V_0$.

It was shown in the patent '074 that the down-spin electrons emit magnons with wave vectors q in the range $q_1 \leq q \leq q_2$, where $q_{1,2} = \hbar^{-1} (p_0 \mp p)$, $p_0 = (2 m \Delta)^{1/2}$, $p = (2 m E_f)^{1/2} << p_0$. Given that the Fermi energy depends on time according to Eq. (15), both $q_1$ and $q_2$ depend on time:

$$q_{1,2}(t) = q_{1,2}(0)\left[1 \mp \frac{p(V_0)Bv(t)}{2p_0}\right],$$ Eq. (16)

$q_{1,2}(0) = \hbar^{-1}[p_0 \mp p(V_0)]$, and $p(V_0) = (2mE_f^0)^{1/2}$.

As was shown in the patent '074 that at electron pumping rate exceeding a threshold value, only magnons with q very close to $q_1$ are generated. Thus, under the effect of the AC bias v(t), the frequency of the generated magnons will change with time as follows:

$$\omega_q(t) = \Omega_q - B\omega_{q_0}(p(V_0)/p_0)v(t),$$ Eq. (17)

where $\Omega_q = \omega_{q_0}[1 - 2p(V_0)/p_0]$.

It follows from Eq. (17) that transverse fluctuations of the magnetization $m_q$ are as follows:

$$m_q(t) = m_q(0)\exp[i(\Omega_q t - B\omega_{q_0}(p(V_0)/p_0)v(t)t].$$ Eq. (18)

Consider the time dependent bias:

$$v(t) = v(0)\mathrm{sinc}(\omega t/\pi) = v(0)(\sin(\omega t)/\omega t).$$ Eq. (19)

Then the time dependence of $m_q$ is given by $$m_q(t) = m_q(0)\exp[i(\Omega_q t - (b/\omega)\sin \omega t)],$$ Eq. (20)

where $b = Bv(0)\omega_{q_0}p(V_0)/p_0$.

Eq. (20) is analogous to Eq. (4) with γh replaced by b. Thus, Eq. (20), like Eq. (4) describes an FM wave. With $E_f/\Delta \approx 10^{-2}$, i.e. $p(V_0)/p_0 \approx 10^{-1}$, and $Bv(0) \approx 10^{-1}$-$10^{-2}$, the argument of the Bessel functions will be equal to 1 if the modulating frequency is of order of $10^{-2}$-$10^{-3}$ of the carrier frequency. Thus, for a carrier frequency 1 THz, the modulating frequency can be as high as 10 GHz. It follows from the discussion given above, that quasi-photons generated by interaction between two quasi-magnons can be also frequency modulated with the same modulation frequency ω by application of the same AC bias of Eq. (19).

F. Experimental Setup. Frequency Modulation Via Application of AC Electric Field.

For example, in the U.S. Pat. No. 6,943,651, a dielectric resonator device including a dielectric substrate is disclosed. A circular TE010-mode resonator in the center of the dielectric substrate is formed by circular openings formed on the electrode films. In the TE010-mode resonator, its resonant frequency could be set to is set to, for example, 300 GHz ($f_0$=300 GHz), and its diameter could be set to, for example, approximately 3.5 mm, which is a value approximately equal to wavelength of a high frequency signal corresponding to the resonant frequency in the dielectric substrate. Thus, one can use the experimental setup of '651 patent and place the MGM into the TE010-mode resonator having microwave electric field with frequency up to 300 GHz to modulate the generated THz radiation.

G. Application of Modulated THz Radiation.

The modulated THz radiation can be used to transmit much more information in THz spectrum as compared to communication in GHz spectrum. Indeed, if one can modulate THz waves with modulating frequency 20 GHz, the number of telephone conversations that can be carried out by using a single 1 THz carrier is approximately 20 GHz/20 KHz=$10^6$ telephone conversations simultaneously. On the other hand, if a 1 GHz single carrier is used and is modulated by 20 MHz, it can carry only 20 MHz/20 kHz=$10^3$ telephone conversations simultaneously.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method of modulating terahertz radiation comprising:
    (A) generating Terahertz radiation by pumping nonequilibrium electrons into a Magnon Gain Medium (MGM) placed in a magnon cavity; wherein said nonequilibrium electrons emit nonequilibrium magnons, and wherein interaction between said nonequilibrium magnons in said Magnon Gain Medium (MGM) causes generation of said Terahertz radiation; and
    (B) applying an external field to said Magnon Gain Medium (MGM) wherein said external field is configured to modulate said generated Terahertz radiation.

2. The method of claim 1, wherein said step (A) further comprises:
    (A1) providing said Magnon Gain Medium (MGM);
    (A2) providing said magnon cavity comprising at least one Magnon Mirror (MM); and
    (A3) pumping nonequilibrium electrons into said Magnon Gain Medium (MGM) by using an electron pumping means.

3. The method of claim 1, wherein said step (A) further comprises:
    (A4) placing said Magnon Gain Medium (MGM) in a thermostat to maintain temperature of said MGM below a critical temperature.

4. The method of claim 2, wherein said step (A1) further comprises:
    (A1, 1) coupling said Magnon Gain Medium (MGM) to a non-magnetic spacer; said non-magnetic spacer being placed adjacent to said border of said MGM; and
    (A1, 2) providing an external magnetic material being placed adjacent to said spacer; wherein said spacer separates the exchange coupling within said Magnon Gain Medium (MGM) from the exchange coupling within said external magnetic material.

5. The method of claim 2, wherein said step (A2) further comprises:
    (A2, 1) providing said magnon cavity comprising said at least one Magnon Mirror (MM); wherein said Magnon Mirror (MM) further includes a Magnon Mirror Border (MMB) located adjacent to said Magnon Gain Medium (MGM); said Magnon Mirror Border (MMB) having the roughness, r; wherein said roughness r of said MMB is lesser than said non-equilibrium magnon wave length $\lambda$.

6. The method of claim 2, wherein said step (A2) further comprises:
    (A2, 2) providing said magnon cavity comprising at least two said Magnon Mirrors (MM).

7. The method of claim 2, wherein said step (A2) further comprises:
    (A2, 3) providing said magnon cavity comprising a Circular Magnon Mirror (CMM).

8. The method of claim 1, wherein said step (B) further comprises:
    (B1) modulating said Terahertz radiation generated by placing said Magnon Gain Medium (MGM) into a longitudinal alternating current (AC) magnetic field.

9. The method of claim 1, wherein said step (B) further comprises:
    (B2) frequency modulating said Terahertz radiation by placing said Magnon Gain Medium (MGM) into said longitudinal AC magnetic field.

10. The method of claim 1, wherein said step (B) further comprises:
    (B3) modulating transverse fluctuations of a magnetic moment of said Magnon Gain Medium (MGM) by applying said longitudinal AC magnetic field.

11. The method claim of 1, wherein said step (B) further comprises:
    (B4) tuning the main frequency of said Terahertz radiation by placing said Magnon Gain Medium (MGM) into an external DC magnetic field, and by changing an amplitude of said external DC magnetic field.

12. The method of claim 1, wherein said step (B) further comprises:
    (B5) modulating said Terahertz radiation by placing said Magnon Gain Medium (MGM) into an alternating current (AC) electric field.

13. The method of claim 1, wherein said step (B) further comprises:
    (B6) frequency modulating said Terahertz radiation by placing said Magnon Gain Medium (MGM) into an alternating current (AC) electric field.

14. The method of claim of 1, wherein said step (B) further comprises:
    (B7) tuning a main frequency of said Terahertz radiation by applying a direct current (DC) electric field to said Magnon Gain Medium (MGM).

15. The method claim of 1, wherein said step (B) further comprises:
    (B8) modulating the concentration of electrons in a spin-down subband of said Magnon Gain Medium (MGM) by applying an AC electric field to said Magnon Gain Medium (MGM).

16. The method of claim of 1, wherein said step (B) further comprises:
    (B9) modulating the Fermi energy of said Magnon Gain Medium (MGM) by applying an AC electric field to said Magnon Gain Medium (MGM).

17. The method of claim of 1 further comprising:
    (C) using said modulated THz radiation to transmit information in THz spectrum of frequencies.

18. The method of claim of 17, wherein said step (C) further comprises:
    (C1) using said modulated THz radiation with modulating frequency up to 100 GHz to transmit information in THz spectrum of frequencies.

19. An apparatus for generating modulated terahertz radiation comprising:
    (A) a means for generating Terahertz radiation by pumping nonequilibrium electrons into Magnon Gain Medium (MGM); wherein said nonequilibrium electrons emit nonequilibrium magnons, and wherein interaction between said nonequilibrium magnons in said Magnon Gain Medium (MGM) causes generation of said Terahertz radiation;
and (B) a means for modulating said generated Terahertz radiation.

20. The apparatus of claim 19, wherein said means (A) further comprises:
   (A1) a magnon cavity comprising at least one Magnon Mirror (MM); wherein said Magnon Gain Medium (MGM) is placed into said magnon cavity.

21. The apparatus of claim 19, wherein said means (A) further comprises:
   (A2) a magnon cavity comprising at least one Magnon Mirror (MM); wherein said Magnon Mirror (MM) further includes a Magnon Mirror Border (MMB) located adjacent to said Magnon Gain Medium (MGM); said Magnon Mirror Border (MMB) having the roughness, r; wherein said roughness r of said MMB is lesser than said non-equilibrium magnon wave length $\lambda$.

22. The apparatus of claim 19, wherein said means (A) further comprises:
   (A3) a magnon cavity comprising at least two said Magnon Mirrors (MM).

23. The apparatus of claim 19, wherein said means (A) further comprises:
   (A4) a magnon cavity comprising a Circular Magnon Mirror (CMM).

24. The apparatus of claim 19, wherein said means (A) further comprises:
   (A5) a thermostat configured to maintain temperature of said Magnon Gain Medium (MGM) below a critical temperature; said Magnon Gain Medium (MGM) being placed into said magnon cavity.

25. The apparatus of claim 19, wherein said means (A) further comprises:
   (A6) an electron pumping means.

26. The apparatus of claim 19, wherein said means (B) further comprises:
   (B1) a generator of longitudinal alternating current (AC) magnetic field; wherein said Terahertz radiation is modulated by placing said Magnon Gain Medium (MGM) into said longitudinal alternating current (AC) magnetic field.

27. The apparatus of claim 19, wherein said means (B) further comprises:
   (B2) a generator of DC magnetic field; wherein the main frequency of said Terahertz radiation is tuned by placing said Magnon Gain Medium (MGM) into said external DC magnetic field, and by changing an amplitude of said external DC magnetic field.

28. The apparatus of claim 19, wherein said means (B) further comprises:
   (B3) a generator of alternating current (AC) electric field; wherein said Terahertz radiation is modulated by placing said Magnon Gain Medium (MGM) into said alternating current (AC) electric field.

29. The apparatus of claim 19, wherein said means (B) further comprises:
   (B4) a generator of DC electric field; wherein the main frequency of said Terahertz radiation is tuned by placing said Magnon Gain Medium (MGM) into said external DC electric field, and by changing an amplitude of said external DC electric field.

\* \* \* \* \*